US007546322B2

(12) United States Patent
Lehner (10) Patent No.: US 7,546,322 B2
(45) Date of Patent: Jun. 9, 2009

(54) GENERATING UNIQUE NAME/VERSION NUMBER PAIRS WHEN NAMES CAN BE RE-USED

(75) Inventor: Mary Claire Lehner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 11/076,653

(22) Filed: Mar. 9, 2005

(65) Prior Publication Data

US 2006/0206540 A1 Sep. 14, 2006

(51) Int. Cl.
G06F 17/30 (2006.01)

(52) U.S. Cl. .................. 707/203; 707/200; 707/201; 717/121; 717/122

(58) Field of Classification Search ........................ None
See application file for complete search history.

(56) References Cited

U.S. PATENT DOCUMENTS

| | | | | | |
|---|---|---|---|---|---|
| 5,619,700 | A | * | 4/1997 | Abe | 717/122 |
| 5,649,200 | A | * | 7/1997 | Leblang et al. | 717/122 |
| 6,101,507 | A | * | 8/2000 | Cane et al. | 707/204 |
| 6,154,742 | A | | 11/2000 | Herriot | 707/10 |
| 6,385,768 | B1 | * | 5/2002 | Ziebell | 717/121 |
| 6,460,052 | B1 | * | 10/2002 | Thomas et al. | 707/203 |
| 6,549,916 | B1 | | 4/2003 | Sedlar | 707/200 |
| 6,578,069 | B1 | | 6/2003 | Hopmann et al. | 709/203 |
| 6,658,659 | B2 | | 12/2003 | Hiller et al. | 717/170 |
| 6,718,351 | B2 | * | 4/2004 | Sellen et al. | 707/203 |
| 6,725,242 | B2 | | 4/2004 | Gardner | 707/203 |
| 7,209,933 | B2 | * | 4/2007 | Saxena | 707/203 |
| 7,251,655 | B2 | * | 7/2007 | Kaler et al. | 707/9 |
| 2002/0103815 | A1 | | 8/2002 | Duvillier et al. | 707/203 |
| 2003/0115223 | A1 | | 6/2003 | Scott et al. | 707/203 |
| 2003/0120688 | A1 | | 6/2003 | Hill et al. | 707/203 |
| 2003/0195779 | A1 | | 10/2003 | Scholl et al. | 705/7 |
| 2004/0015860 | A1 | | 1/2004 | Craft et al. | 717/122 |
| 2004/0039745 | A1 | | 2/2004 | Evans et al. | 707/100 |
| 2004/0158575 | A1 | | 8/2004 | Jacquenot et al. | 707/102 |
| 2006/0101092 | A1 | * | 5/2006 | Ishida et al. | 707/203 |
| 2006/0136511 | A1 | * | 6/2006 | Ngo et al. | 707/203 |

* cited by examiner

*Primary Examiner*—Kuen S Lu
*Assistant Examiner*—Michelle Owyang
(74) *Attorney, Agent, or Firm*—Janet M. Skafar; Christine H. Smith; Douglas Lefeve (57) ABSTRACT

Various embodiments of a method, system and article of manufacture provide a version number. An object has a present name and a present version number. In response to changing the present name of the object to a different name, the different name having been used by one or more other objects, one or more values of one or more first components of one or more other version numbers associated with the one or more other objects, respectively, are identified. An other version number is generated wherein a value of the first component of the other version number is different from the one or more values of the one or more first components.

15 Claims, 5 Drawing Sheets

Prior Art

GENERATING UNIQUE NAME/VERSION NUMBER PAIRS WHEN NAMES CAN BE RE-USED

BACKGROUND OF THE INVENTION 1.0 Field of the Invention

This invention relates to versioning, and in particular, to generating unique name/version number pairs when names can be re-used.

2.0 Description of the Related Art

In computer systems, information is typically stored in files. A file is an object in a computer system. An object may also be a directory or folder. A user typically changes the information in a file which provides various versions of the file. A version control system may be used to keep track of the versions of a file.

A version control system is a software application that keeps track of various versions of objects, referred to as versioned objects. Some version control systems generate a version number for each versioned object. A versioned object has a name, which is typically set by the user, and a version number. The combination of the name and the version number provides an identifier to a particular version of the object, and also reflects the derivation history of the versioned object. A name/version number pair refers to a version of an object which is associated with a version number, and is represented by the name of the object, for example "A", followed by a colon then the version number, such as A:1.0.

One well-known algorithm for generating version numbers can be used if the same name can never be used by more than one object. In this algorithm, each version number is a series of dot-separated integers. A version number of 1.0 is assigned to the first version of an object. The version number of the first successor to a versioned object is generated by incrementing the last integer in the dot-separated series by one. Each successor after the first successor appends a versioning pair comprising two more integers (n.0) to the end of the series, where "n" is increased by one for each successor.

Figure 1:
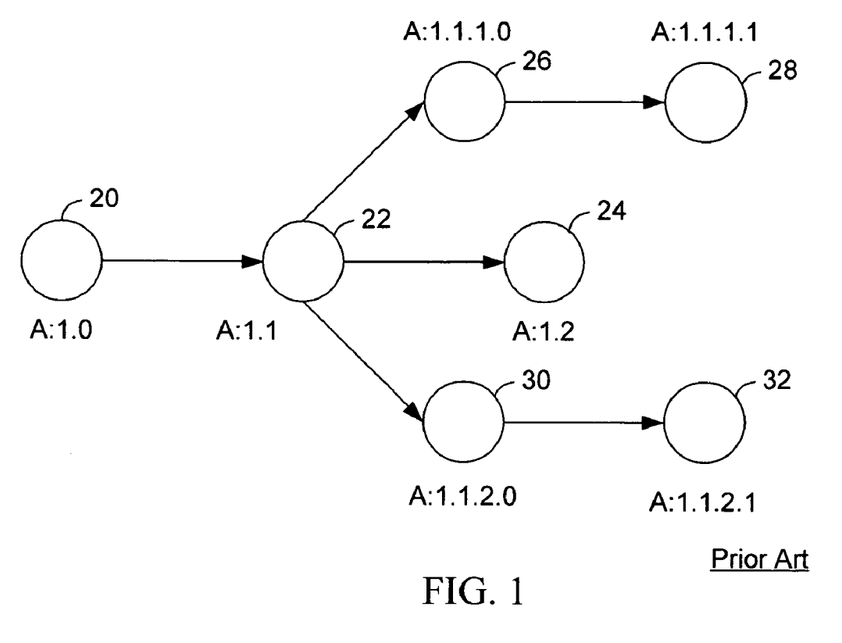
FIG. 1 depicts a diagram illustrating version numbers which were generated using a well-known algorithm.

FIG. 1 depicts a diagram illustrating version numbers which were generated using the well-known algorithm described above. Initially a versioned object 20, named "A" is associated with a version number of 1.0. Version 1.0 of "A" is modified to provide a first successor 22 which is associated with a version number of 1.1. Version 1.1 of "A" 22 is modified to provide a first successor 24 which is associated with version number 1.2.

Version 1.1 of "A" is modified again to provide a second successor 26 which is associated with a version number of 1.1.1.0. That is, a versioning pair of (1.0) is appended to the version number of 1.1. Version 1.1.1.0 of "A" 26 is modified to provide a first successor 28 which has a version number of 1.1.1.1.

Version 1.1 of "A" is again modified to provide a third successor 30 which is associated with version number 1.1.2.0. In this example, a versioning pair of (2.0) is appended to the version number 1.1. Version 1.1.2.0 of "A" is then modified to provide a first successor 32 having version number of 1.1.2.1.

In another example of the technique above, successive versions of an object named "A" are: A:1.0, A:1.1 and A:1.2. Successive versions of an object named "B" are B:1.0, B:1.1, B:1.2 and B:1.3. This name and version numbering scheme works as long as no version of object A can ever have its name changed, for example to "B", because this would result in the following name and version numbers for the object: A:1.0, A:1.1, A:1.2 and B:1.3, and leads to a conflict with the identifiers of any other object named B. However, it is common for the same name to be associated at different times with different objects. For example the object originally named "B" might be renamed to "C," allowing the name "B" to be reassigned to the object originally named "A.". Using the conventional name and version numbering technique results in a conflict. Therefore there is a need for an improved technique for version numbering.

SUMMARY OF THE INVENTION

To overcome the limitations in the prior art described above, and to overcome other limitations that will become apparent upon reading and understanding the present specification, various embodiments of a method, system and article of manufacture of providing a version number are described. An object has a present name and a present version number. In response to changing the present name of the object to a different name, the different name having been used by one or more other objects, one or more values of one or more first components of one or more other version numbers associated with the one or more other objects, respectively, are identified. Another version number is generated wherein a value of a first component of the other version number is different from the one or more values of the one or more first components.

In this way, a unique name/version number pair can be provided when names can be re-used.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to provide unique name/version number pairs when names can be re-used. Various embodiments of a method, system and article of manufacture provide a version number. An object has a present name and a present version number. In response to changing the present name of the object to a different name, the different name having been used by one or more other objects, one or more values of one or more first components of one or more other version numbers associated with the one or more other objects, respectively, are identified. Another version number is generated wherein a value of a first component of the other version number is different from the one or more values of the one or more first components.

In various embodiments, a component is an integer, and the version number is a dot-separated series of integers. In the well-known algorithm described in the background, the first integer of the version number in the dot-separated series is always equal to one and therefore has no significance. In accordance with various embodiments of the invention, a technique is provided which exploits the first integer of the version number in the dot-separated series to differentiate between different versioned objects that use the same object name. To generate a new version number for an object when the name of that object changes to a name which has been used for another versioned object, in one embodiment, the technique determines the highest value of the first integer of the version number associated with the new object name, increments that highest value which provides an incremented value, and uses the incremented value as the first integer of the dot-separated series, that is, the version number associated with the new object name for the object. In this way, the combined name and version number of any version of an object is unique.

For example, if an object named "A" is renamed to "B" to provide a new version of the object. If a version of another other object has used the name "B" with a name/version pair of B:1.2, and if the new version of the object is the first successor to A:1.2, the new name/version number pair of the new version of the object is B:2.3, or if the new version of the object is the second successor to A:1.2, the new name/version number pair of the new version of the object is B:2.2.1.0. If versions of two other objects have used the name "B" and the new version is the first successor to A:1.2, the new name/version number pair will be B:3.3, or if it is the second successor to A:1.2, the new name/version number pair will be B:3.2.1.0.

In various embodiments, a version number is a delimiter-separated series of components. The delimiter is used to separate the components of the version number and is typically a predefined character. In some embodiments, the delimiter is a dot. Alternately, characters other than a dot may be used as the delimiter. The component is typically an integer. A component pair comprises two components, which are also referred to as pair components.

A version number of n.m is assigned to the first version of an object. Typically the first version number is 1.0; however, values other than one and zero may be used.

A namespace is a set of names, each of which is unique within the set, such as the names of files in a folder.

Figure 2:
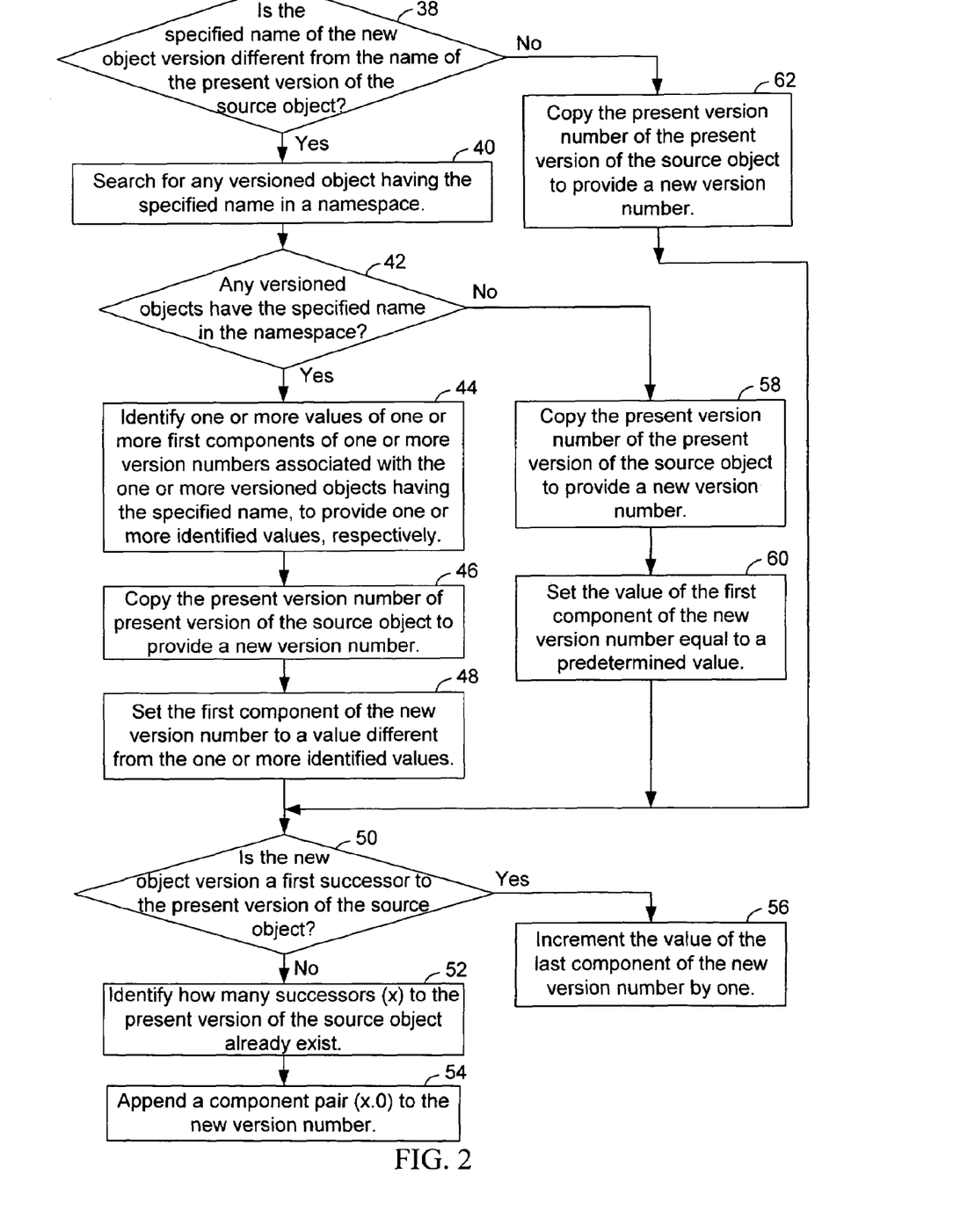
FIG. 2 depicts a flowchart of an embodiment of a technique for providing version numbers.

FIG. 2 depicts a flowchart of an embodiment of a technique for providing version numbers. A present version of a source object has a present name and a present version number. A new object version is created based on the present version of the source object. The name of the new object version is a specified name which is typically provided by a user. Step 38 determines whether the specified name of the new object version is different from the name of the present version of the source object. If so, in step 40, a search is performed for any versioned objects having the specified name in a namespace. Step 42 determines whether any versioned objects have the specified name in the namespace. In some embodiments, steps 40 and 42 are combined. In response to step 42 determining that there is at least one versioned object having the specified name in the namespace, in step 44, one or more values of one or more first components of one or more version numbers associated with the specified name are identified to provide one or more identified values, respectively. In step 46, the present version number of the present version of the source object is copied to provide a new version number. In step 48, the first component of the new version number is set equal to a value different from the one or more identified values.

Step 50 determines whether the new object version is a first successor to the present version of the source object. If not, step 52 identifies how many successors (x) to the present version of the source object already exist. In step 54, a component pair (x.0) is appended to the new version number. For example, when generating a version number for a second successor to the present version of the source object, x is equal to 1 and a component pair of (1.0) is appended. More generally, for an $n^{th}$ successor to a present version of a source object, a component pair of ((n−1).0) is appended.

If step 50 determines that the new object version is a first successor to the present version of the source object, in step 56, the value of the last component of the new version number is incremented by one.

If step 42 determines that no versioned objects have the specified name in the namespace, in step 58, the present version number of the present version of the source object is copied to provide a new version number. In step 60, the first component of the new version number is set equal to a predetermined starting value, such as one, and step 60 proceeds to step 50. In some embodiments, step 60 is omitted. If step 38 determines that the name of the present version of the source object is not being changed, in step 62 the present version number of the present version of the source object is copied to provide a new version number. Step 62 proceeds to step 50.

In various embodiments, the components of the version number are integers, and the value of the first component of the new version number is incremented sequentially. In some embodiments, in step 44, the highest value of the one or more identified values is also identified; and in step 48, the first component of the new version number is set to a value equal to the highest value incremented by a predetermined value. In various embodiments, the predetermined value is equal to one.

A conventional mechanism, such as a table, is used to associate names and version numbers with the appropriate versions of an object. For example, in some embodiments, a database table is used.

Figure 3:
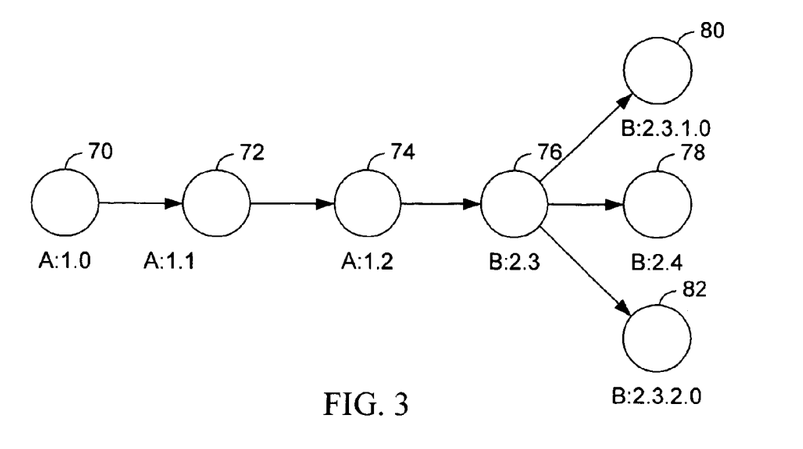
FIG. 3 depicts a diagram of an example of generating version numbers using the technique of FIG. 2.

FIG. 3 depicts a diagram of an example of generating version numbers using the technique of FIG. 2. The generation of name/version number pairs of various object versions of FIG. 3 will be described with reference to FIG. 2. In a namespace, the name/version number pairs of A:1.0, A:1.1 and A:1.2, 70, 72 and 74, respectively, for a versioned object were generated in a conventional manner. In this example, the name "B" was used for another object in the namespace with a name/version number pair of B:1.0. In this example, a user is editing the object version associated with a name/version number pair of A:1.2, that is, a present version of a source object, and therefore the present version number is 1.2. The user creates a new object version based on the version of the source object having a name/version number pair of A:1.2, with a different name of "B" thereby changing the name of the version of the source object to "B" and a new version number is generated using the technique of FIG. 2. Step 38 determines that the name of the new object version is different from the present name of the present version of the source object and proceeds to step 40. In step 40, a search is performed for any versioned object having the name "B" in the namespace and a versioned object having a name/version number pair of B:1.0 is found. Therefore, step 42 proceeds to step 44. In step 44, a first component having the value of 1 is identified for the found versioned object which has a name of "B." Therefore the identified value is 1. In step 46, the present version number of 1.2 is copied to provide a new version number of 1.2. In step 48, the first component of the new version number is set to a value different from the identified value of 1. In this example, the value of 1 is incremented to provide a different value of two, and the new version number is 2.2. Step 50 determines whether the new object version is a first successor to the present version of the source object A:1.2. In this example, the new object version is a first successor and step 50 proceeds to step 56. In step 56, the value of the last component of the new version number is incremented by one to provide a new version number of 2.3 Therefore, the new object version has a name/version number pair of B:2.3 as illustrated by element 76 of FIG. 3.

Continuing with the example, another object version of a source object is created using the same name of "B." In this example, the present version of the source object has a name/version number pair of B:2.3. Step 38 determines that the name of the new object version is not different from the name of the present version of the source object, and proceeds to step 62. In step 62, the present version number of the present version of the source object is copied to provide a new version number of 2.3, and step 62 proceeds to step 50. Step 50 determines that the new object version is a first successor to the present version of the source object which is associated with the name/version number pair of B:2.3; and step 50 proceeds to step 56. In step 56, the value of the last component of the new version number is incremented by one and the new version number is equal to 2.4. In this way, the new object version 78 has a name/version number pair of B:2.4.

In another example, yet another object version of the source object is created using the same name of "B." In this example, the present version of the source object has a name/version number pair of B:2.3. Step 38 determines that the name of the new object version is not different from the name of the present version of the source object, and proceeds to step 62. In step 62, the present version number of the version of the source object is copied to provide a new version number of 2.3, and step 62 proceeds to step 50. Step 50 determines that the new object version is not a first successor to the present version of the source object which is associated with the name/version number pair of B:2.3, and step 50 proceeds to step 52. In step 52, the number of existing successors (x) to the present version of the source object are identified. In this example, a first successor exists; therefore x is equal to 1. The new object version is a second successor to the present version of the source object. In step 54, a component pair of (1.0) is appended to the new version number. Therefore the new version number is 2.3.1.0 and the new object version 80 is associated with a name/version number pair of B:2.3.1.0.

As shown in FIG. 3, a third successor 82 to the object version associated with name/version number pair B:2.3 is created. The third successor has a name/version number pair of B:2.3.2.0.

Figure 4:
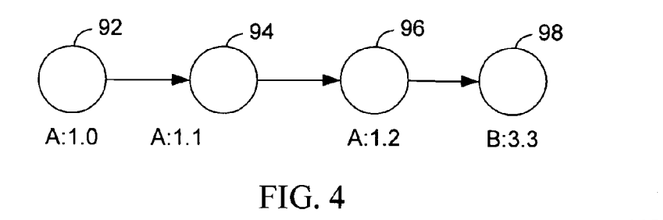
FIG. 4 depicts a diagram of another example of generating version numbers using the technique of FIG. 2.

FIG. 4 depicts a diagram of another example of generating version numbers using the technique of FIG. 2. The versions A:1.0, A:1.1 and A:1.2, 92, 94 and 96, respectively, were generated using the conventional technique described above. In this example, the name "B" was used with two other versioned objects. For example, there is a name/version number pair of B:1.0 and a name version number pair of B:2.3. Next, a user creates a new object version based on the object version 96 which has a name/version number pair of A:1.2. The new object version 98 has a new name of "B" and is a first successor to object version 96. As shown in FIG. 4, the new object version 98 has a name/version number pair of B:3.3.

Figure 5:
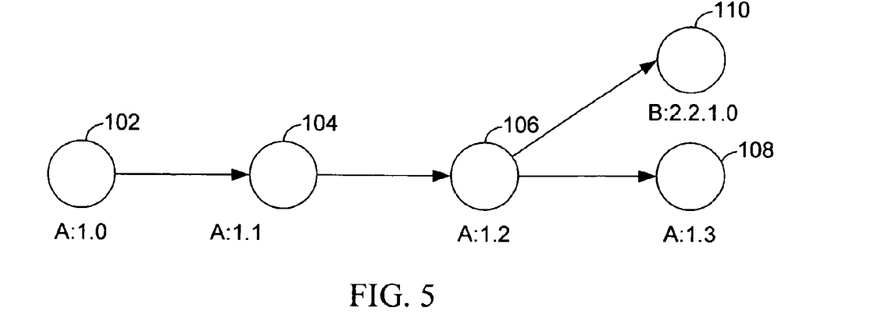
FIG. 5 depicts a diagram of yet another example of generating version numbers using the technique of FIG. 2.

FIG. 5 depicts a diagram of yet another example of generating version numbers using the technique of FIG. 2. The name/version number pairs A:1.0, A:1.1, A:1.2 and A:1.3, 102, 104, 106 and 108, respectively, were generated using the well-known technique described above. In this example, the name "B" was used with one other versioned object, for example, having a name/version number pair of B:1.0. A new object version 110 which is a second successor to the object version 106 which is associated with a name/version number pair of A:1.2 is created. The new object version 110 has a name of "B" and is associated with a name/version number pair of B:2.2.1.0.

Figure 6:
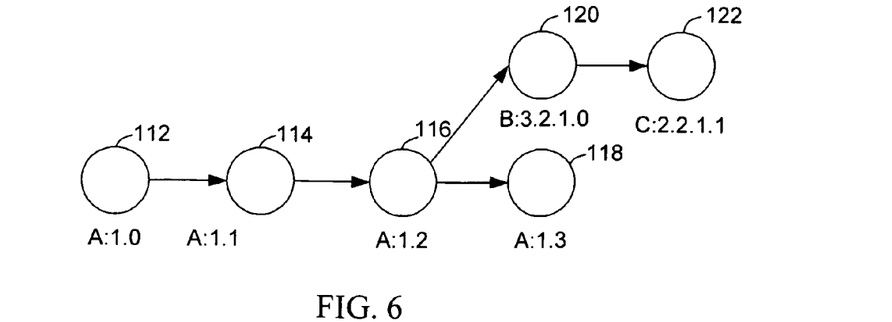
FIG. 6 depicts a diagram of another example of generating version numbers using the technique of FIG. 2.

FIG. 6 depicts a diagram of yet another example of generating version numbers using the technique of FIG. 2. The name/version number pairs A:1.0, A:1.1, A:1.2 and A:1.3, 112, 114, 116 and 118, respectively, were generated using the well-known technique described above. In this example, the name "B" is associated with two other object versions, for example, associated with B:1.0 and B:2.2, and the name "C" is associated with one other object version, for example, associated with C:1.0. The second successor 120 to the object version 116 associated with name/version number pair A:1.2 is named "B." As shown in FIG. 6, the second successor 120 is associated with a name/version number pair of B:3.2.1.0. As shown in FIG. 6, the first successor 122 to the object version associated with B:3.2.1.0 is named "C," and the name/version number pair associated with that first successor 122 is C:2.2.1.1.

Figure 7:
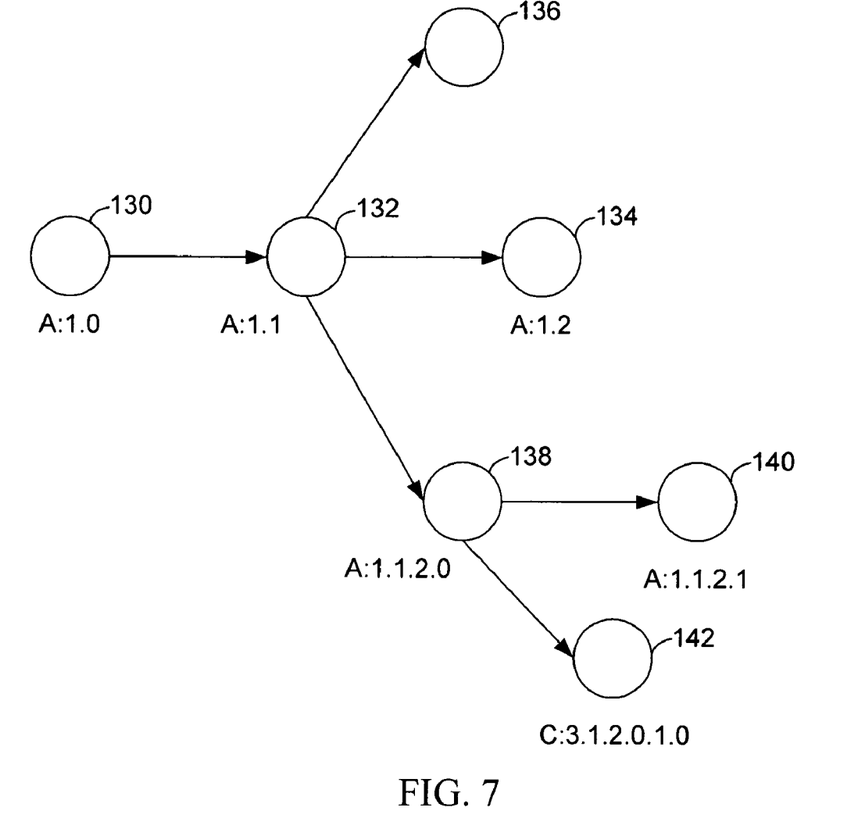
FIG. 7 depicts a diagram of yet another example of generating version numbers using the technique of FIG. 2.

FIG. 7 depicts a diagram of yet another example of generating version numbers using the technique of FIG. 2. The object versions associated with name/version number pairs A:1.0, A:1.1, A:1.2, A:1.1.1.0, A:1.1.2.0 and A:1.1.2.1, 130, 132, 134, 136, 138 and 140 were generated using the conventional technique described above. In this example, the name "C" has been used with two other object versions, for example, C:1.0 and C:2.3. The object version 138 associated with name/version number pair A:1.1.2.0 is modified and named as "C". The object version 142 named "C" is associated with a name/version number pair of C:3.1.2.0.1.0.

In various embodiments, a version control system provides a map associating names and version numbers with objects, for example that A:1.2 and B:1.2.1.0 are versions of the same object.

In some embodiments, the name of an object plus its version number is used as an identifier for the version of the object. Using an application programming interface (API), an object identifier (OID) of an object is available to a user in addition to an identifier which associates the object name and version number so it is possible to identify versions of the same object, and the version numbers reflect the derivation history. In some embodiments which use a graphical user interface, the OID is not displayed. However, the user is able to determine which versions are versions of the same object by requesting all the other versions of a particular object.

Table 1 below shows an illustrative history of a versioned object. A version column shows the version number. A date column shows the date that the version was generated. A uniform resource identifier (URI) column shows the full path to the versioned object.

TABLE 1

| Version | Date | URI |
| --- | --- | --- |
| 1.0 | Dec. 30, 2004 | Folder1/Name1/1.0 |
| 1.1 | Jan. 10, 2004 | Folder1/Name1/1.1 |
| 1.2 | Jan. 12, 2004 | Folder1/Name1Renamed/1.2 |
| 2.3 | Jan. 15, 2004 | Folder1/ReusedName/2.3 |

Table 1 indicates that a first version 1.0 of an object named "Name1" is created in Folder1 on Dec. 30, 2004. The URI is Folder1/Name1/1.0. Table 1 also indicates that on Jan. 10, 2004, the object called "Name1" was modified and the version number is changed to 1.1. The URI is Folder1/Name1/1.1. The next row of Table 1 indicates that on Jan. 12, 2004, the object is renamed to "Name1Renamed" and the associated version number is 1.2 because "Name1Renamed" has not been used in the namespace. The next row of Table 1 indicates that on Jan. 15, 2004, the name of the object is changed again. This time the object name has been used with one other object within the namespace. For example there is another object associated with "ReusedName" having a version number of 1.x. Since the version is the first successor to Name1Renamed:1.2, the new version number is 2.3. The URI is Folder1/ReusedName/2.3.

In some embodiments, Table 1 is provided in a graphical user interface. A user can click on the URI to cause the associated object to be displayed.

Figure 8:
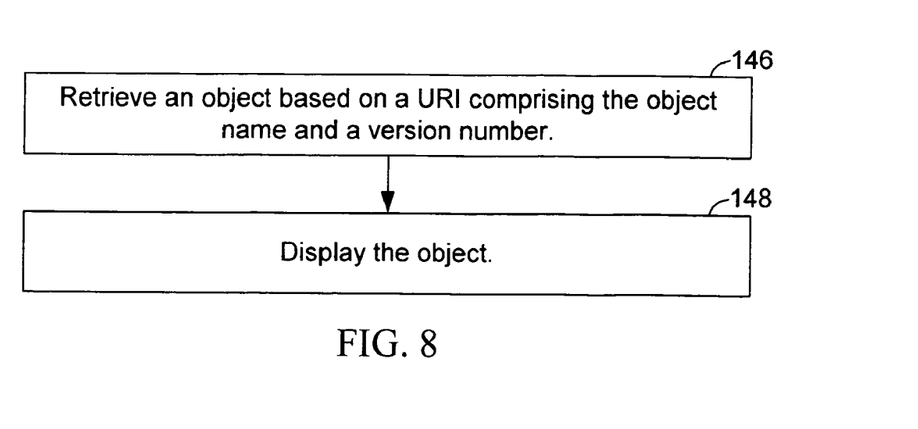
FIG. 8 depicts a flowchart of an embodiment of using the object name and version number as part of a uniform resource identifier to display the associated versioned object.

FIG. 8 depicts a flowchart of an embodiment of using an object name and version number as a URI to display the associated versioned object. In step 146, an object is retrieved based on a URI comprising the object name and a version number. In step 148, the object is displayed.

In various embodiments, the technique provides version numbers such that the combination of a name and version number is unique within the namespace, the version numbers reflect the derivation history even when the name of a versioned object changes, and different versioned objects may use the same name at various points in their life cycles.

Figure 9:
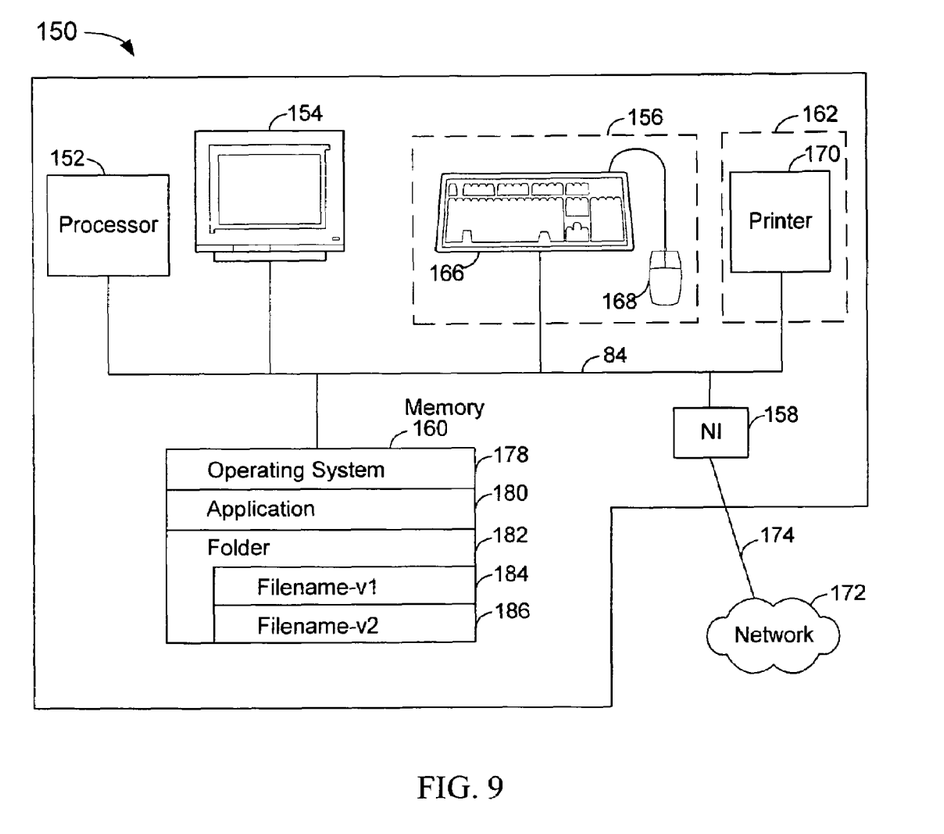
FIG. 9 depicts an illustrative computer system which uses various embodiments of the present invention.

FIG. 9 depicts an embodiment of an illustrative computer system 150 which uses various embodiments of the present invention. The computer system 150 comprises a processor 152, display 154, input interfaces (I/F) 156, communications interface 158, memory 160 and output interface(s) 162, all conventionally coupled by one or more buses 164. The input interfaces 156 comprise a keyboard 166 and a mouse 168. The output interface 162 comprises a printer 170. The communications interface 158 is a network interface (NI) that allows the computer 150 to communicate via the network 172. The communications interface 158 may be coupled to the network 172 via a transmission medium 174 such as a network transmission line, for example twisted pair, coaxial cable or fiber optic cable. In another embodiment, the communications interface 158 provides a wireless interface, that is, the communications interface 158 uses a wireless transmission medium.

The memory 160 generally comprises different modalities, illustratively semiconductor memory, such as random access memory (RAM), and disk drives. In various embodiments, the memory 160 stores an operating system 178 and an application 180 and at least one folder 182.

The application 180 is typically a version control system and implements the flowcharts of FIGS. 2 and 8. In some embodiments, the application 180 also provides a graphical user interface displaying the information of table 1 for a versioned object. The namespace 182 comprises one or more versioned objects—Filename-v1 and Filename-v2, 184 and 186, respectively.

In various embodiments, the specific software instructions, data structures and data that implement various embodiments of the present invention are typically incorporated in the application 180. Generally, an embodiment of the present invention is tangibly embodied in a computer-readable medium, for example, the memory 160, and is comprised of instructions which, when executed by the processor 152, cause the computer system 150 to utilize the present invention. The memory 160 may store the software instructions, data structures and data for any of the operating system 178 and application 180 in semiconductor memory, in disk memory, or a combination thereof. Other computer memory devices presently known or that become known in the future, or combination thereof, may be used for memory 160.

The operating system 178 may be implemented by any conventional operating system such as AIX® (Registered Trademark of International Business Machines Corporation), UNIX® (UNIX is a registered trademark of the Open Group in the United States and other countries), Windows® (Registered Trademark of Microsoft Corporation), Linux® (Registered trademark of Linus Torvalds), Solaris® (Registered trademark of Sun Microsystems Inc.) and HP-UX® (Registered trademark of Hewlett-Packard Development Company, L.P.).

In various embodiments, the present invention may be implemented as a method, computer system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 9 is not intended to limit the present invention. Other alternative hardware environments may be used without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method of providing a version number of a first versioned object having a present name and a present version number, comprising:

in response to changing said present name of said first versioned object to a different name, said different name having been used by a second versioned object, said first versioned object being a first file, said present name being a file name of said first file, said second versioned object being a second file, said second file being different from said first file, said different name being a file name of said second file, said different name not being used by a previous version of said first versioned object, said second versioned object using said different name being associated with an existing version number comprising delimiter-separated components having a starting component and an ending component, said starting component being a left-most component of said delimiter-separated components, said ending component being a right-most component of said delimiter-separated components, identifying a value of said starting component of said existing version number associated with said second versioned object;

generating a new version number for said first versioned object having said different name, said new version number comprising a new plurality of components, wherein a value of a new starting component of said new plurality of components of said new version number is different from said value of said starting component of said existing version number associated with said second versioned object, said new starting component being a left-most component of said new plurality of components of said new version number;

wherein in response to said different name being associated with a first successor of said first versioned object with respect to said present version number, said generating increments a value of an ending component of said present version number to provide a new ending component of said new plurality of components of said new version number, said new ending component being a right-most component of said new plurality of components; and wherein in response to said different name being associated with an $n^{th}$ successor of said first versioned object with respect to said present version number, where n is greater than one, said generating said new version number appends a component pair comprising a pair component equal to n−1 and another pair component equal to a predetermined value to a right end of said new version number.

2. The method of claim 1 wherein a third versioned object having another existing version number uses said different name, said another existing version number comprising another delimiter-separated components having another starting component and another ending component, wherein said identifying identifies a highest value of said starting component of said existing version number associated with said second versioned object and said another starting component of said another existing version number associated with said third versioned object, and said generating said new version number comprises incrementing said highest value by a predetermined value to provide an incremented value, and said new starting component of said new plurality of components of said new version number is set to said incremented value.

3. The method of claim 1 wherein said new plurality of components of said new version number is a delimiter-separated series of components.

4. The method of claim 1 wherein a uniform resource identifier (URI) comprises said different name and said new version number.

5. The method of claim 4 further comprising: displaying said first versioned object associated with said URI.

6. An article of manufacture for providing a version number of a first versioned object having a present name and a present version number, said article of manufacture comprising:

a computer readable storage medium;

first program instructions to computer usable program code for, in response to changing said present name of said first versioned object to a different name, said different name having been used by a second versioned object, said first versioned object being a first file, said present name being a file name of said first file, said second versioned object being a second file, said second file being different from said first file, said different name being a file name of said second file, said different name not being used by a previous version of said first versioned object, said second versioned object using said different name being associated with an existing version number comprising delimiter-separated components having a starting component and an ending component, said starting component being a left-most component of said delimiter-separated components, said ending component being a right-most component of said delimiter-separated components, identify a value of said starting component of said existing version number associated with said second versioned object; and generate a new version number for said first versioned object having said different name, said new version number comprising a new plurality of components, wherein a value of a new starting component of said new plurality of components of said new version number is different from said value of said starting component of said existing version number associated with said second versioned object, said new starting component being a left-most component of said new plurality of components of said new version number;

wherein in response to said different name being associated with a first successor of said first versioned object with respect to said present version number, said first program instructions to generate said new version number increments a value of an ending component of said present version number to provide a new ending component of said new plurality of components of said new version number, said new ending component being at a right- most component of said new plurality of components;

wherein in response to said different name being associated with an nth successor of said first versioned object with respect to said present version number, where n is greater than one, said first program instructions to generate said new version number appends a component pair comprising a pair component equal to n−1 and another pair component equal to a predetermined value to a right end of said new version number; and wherein said first program instructions are stored on said computer readable storage medium.

7. The article of manufacture of claim 6 wherein a third versioned object having another existing version number uses said different name, said another existing version number comprising another delimiter-separated components having another starting component and another ending component, said third versioned object being a third file, wherein said first program instructions to identify identifies a highest value of said starting component of said existing version number associated with said second versioned object and said another starting component of said another existing version number associated with said third versioned object, and said first program instructions to generate said new version number increments said highest value by a predetermined value to provide an incremented value, and said new starting component of said new plurality of components of said new version number is set to said incremented value.

8. The article of manufacture of claim 6 wherein said new plurality of components of said new version number is a delimiter-separated series of components.

9. The article of manufacture of claim 6 wherein a uniform resource identifier (URI) comprises said different name and said new version number.

10. The article of manufacture of claim 9 further comprising:
 second program instructions to display said first versioned object associated with said URI, wherein said second program instructions are stored on said computer readable storage medium.

11. A computer system providing a version number of a first versioned object having a present name and a present version number, comprising:
 a processor; and
 a memory, storing instructions that when executed cause said processor to:
 in response to changing said present name of said first versioned object to a different name, said different name having been used by a second versioned object, said first versioned object being a first file, said present name being a file name of said first file, said second versioned object being a second file, said second file being different from said first file, said different name being a file name of said second file, said different name not being used by a previous version of said first versioned object, said second versioned object using said different name being associated with an existing version number comprising delimiter-separated components having a starting component and an ending component, said starting component being a left-most component of said delimiter-separated components, said ending component being a right-most component of said delimiter-separated components,
 identify a value of said starting component of said existing version number associated with said second versioned object; and
 generate a new version number for said first versioned object having said different name, said new version number comprising a new plurality of components, wherein a value of a new starting component of said new plurality of components of said new version number is different from said value of said starting component of said existing version number associated with said second versioned object, said new starting component being a left-most component of said new plurality of components of said new version number;
 wherein in response to said different name being associated with a first successor of said first versioned object with respect said present version number, said instructions to generate said new version number increments a value of an ending component of said present version number to provide a new ending component of said new plurality of components of said new version number, said new ending component being a right-most component of said new plurality of components of said new version number; and
 wherein in response to said different name being associated with an nth successor of said first versioned object with respect to said present version number, where n is greater than one, said instructions to generate said new version number appends a component pair comprising a pair component equal to n−1 and another pair component equal to a predetermined value to a right end of said new version number.

12. The computer system of claim 11 wherein said value of said new starting component of said new version number is greater than said value of said starting component of said existing version number associated with said second versioned object using said different name.

13. The computer system of claim 11 wherein said components are integers.

14. The computer system of claim 11 wherein a uniform resource identifier (URI) comprises said different name and said new version number.

15. A computer-implemented method of providing a version number of a first versioned object having a present name and a present version number, comprising:
 in response to changing said present name of said first versioned object to a different name, thereby producing a new version of said first versioned object, said first versioned object being a first file, said present name being a file name of said first file, said different name having been used by a second versioned object, said second versioned object being a second file, said second file being different from said first file, said different name being a file name of said second file, said different name not being used by a previous version of said first versioned object, said second versioned object using said different name being associated with an existing version number comprising delimiter-separated integers having a starting integer and an ending integer, said starting integer being a left-most integer of said delimiter-separated integers, said ending integer being a right-most integer of said delimiter-separated integers, wherein said first file is not a version of said second file, and said second file is not a version of said first file,
 identifying a value of said starting integer of said existing version number associated with said second versioned object;
 in response to said new version of said first versioned object being a first successor with respect to said present version number, generating a first new version number comprising a new plurality of delimiter-separated integers for said first versioned object using said different name, wherein a value of a starting integer of said new plurality of delimiter-separated integers of said first new version number is different from said value of said starting integer of said existing version number associated with said second versioned object, said starting integer of said new plurality of delimiter-separated integers of said new version number being a left-most integer, and a value of an ending integer of said new plurality of delimiter-separated integers of said first new version number is set to a value of an ending integer of said present version number plus one; and
 in response to said new version of said first versioned object being a second successor with respect to said present version number, generating a second new version number comprising another new plurality of delimiter-separated integers for said first versioned object using said different name, wherein a value of a starting integer of said another new plurality of delimiter-separated integers of said second new version number is different from said value of said starting integer of said existing version number associated with said second versioned object, said starting integer of said another new plurality of delimiter-separated integers of said second new version number being a left most integer, and a component pair of (1.0) is appended to a right end of said second new version number.

* * * * *